United States Patent [19]
Leggett

[11] 4,358,772
[45] Nov. 9, 1982

[54] CERAMIC BROADBAND RADOME
[75] Inventor: Hyman Leggett, Chatsworth, Calif.
[73] Assignee: Hughes Aircraft Company, Culver City, Calif.
[21] Appl. No.: 147,889
[22] Filed: Apr. 30, 1980
[51] Int. Cl.³ .............................................. H01Q 1/42
[52] U.S. Cl. .................................................... 343/872
[58] Field of Search ....................... 343/872; 102/105; 252/478

[56] References Cited

U.S. PATENT DOCUMENTS

| | | | |
|---|---|---|---|
| 3,002,190 | 9/1961 | Oleesky et al. | 343/872 |
| 3,195,138 | 7/1965 | Beck et al. | 343/872 |
| 3,292,544 | 12/1966 | Caldwell et al. | 343/872 |
| 3,396,396 | 8/1968 | Charlton et al. | 343/872 |
| 3,460,305 | 8/1969 | Long | 343/872 |
| 3,616,140 | 10/1971 | Copeland | 343/872 |
| 3,780,374 | 12/1973 | Shibano et al. | 343/872 |
| 4,173,187 | 11/1979 | Steverding | 343/872 |

*Primary Examiner*—David K. Moore
*Attorney, Agent, or Firm*—David W. Collins; W. H. MacAllister

[57] ABSTRACT

A ceramic broadband radome is provided, comprising alternating layers of silicon nitride and fused silica, including a layer of silicon nitride at both outer and inner surfaces of the radome wall and at least one additional layer of silicon nitride within the wall. Elevated temperature processing is used to form an in situ prestressed condition. Resistance to stresses induced by thermal differentials, rain erosion, particle impact, aerodynamic loads and crack propagation is improved over other monolithic and sandwich ceramic radomes, while high transmission efficiency is maintained over a wide band of radar frequencies.

10 Claims, 1 Drawing Figure

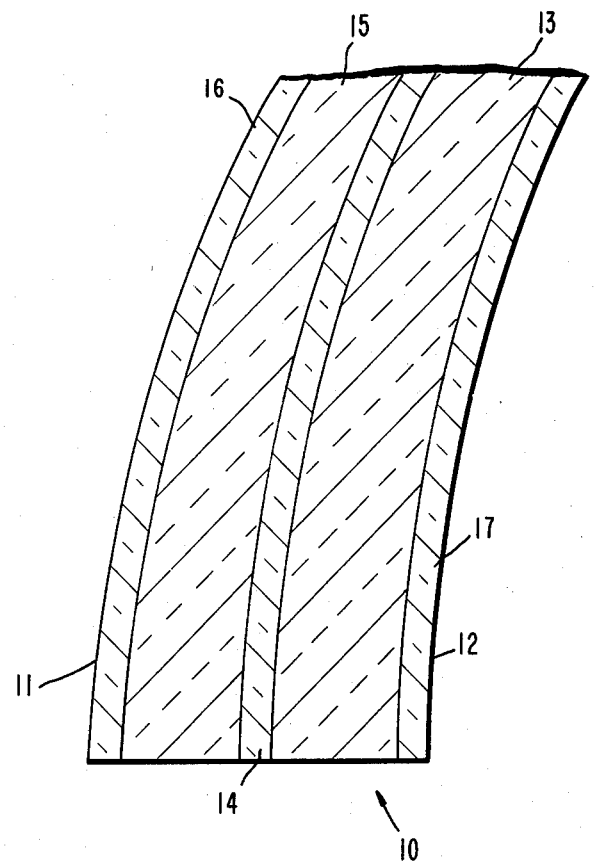

CERAMIC BROADBAND RADOME

The Government has rights in this invention pursuant to Contract No. F33615-77-C-5077 awarded by the Department of the Air Force.

BACKGROUND OF THE INVENTION

1. Field of the Invention

The invention relates to ceramic broadband radomes and, in particular, to a multilayer, prestressed radome, employing alternating layers of silicon nitride and fused silica.

2. Description of the Prior Art

In various types of aircraft and missiles carrying radar equipment, an antenna is mounted in the nose of the craft and is covered with an appropriate aerodynamic surface or radome. The radome must be constructed of material which is strong enough to withstand the aerodynamic forces to which it may be subjected, and yet must be relatively distortion-free and highly transparent to radar energy.

A radome operating at high temperature suitable for aircraft and missiles travelling at supersonic speeds should possess the following properties:

1. high power transmission efficiency over a wide range of radar frequencies;
2. resistance to dust, particle and rain erosion; and
3. resistance to failure due to stresses induced by large thermal differentials.

The electrical materials properties which are most important to the radome designer are the dielectric constant and loss tangent. For acceptable power transmission efficiency, values of less than 10 and 0.01 are required for dielectric constant ($\epsilon$) and loss tangent ($\tan \delta$), respectively. Monolithic or solid wall radomes are designed as electrically thin walls or half-wave walls for maximum power transmission efficiency at the design frequency. Physical design thickness equivalent to an electrical thickness of $\lambda/2$ decreases with increasing dielectric constant. If the physical thickness becomes too thin to sustain aerodynamic loads, the thickness is then increased by some multiple of two, resulting in a second, third or higher order wall. As the wall order and the angle of incidence increase, however, transmission efficiency decreases. Consequently, the physical thickness of a solid wall radome is trade-off between threshhold loads, incident angle and weight incurred by increasing orders of electrical wall thickness. Transmission efficiency is also influenced by deviation from design thickness. As deviations from the design thickness increase, reduction in power transmission efficiency becomes greater with increasing dielectric constant and frequency. At low frequencies, wall thickness tolerances can be large, whereas at high frequencies, the tolerances are more stringent. Design transmission efficiency can be maintained at a high level with large wall thickness tolerances by utilizing an electrically thin wall design, equivalent to $\lambda/10$ or less. However, the physical thickness of these walls is very small and is in general too thin to sustain aerodynamic loads.

Ceramic materials with dielectric properties suitable for use as solid wall radomes are generally limited to silicon nitride, alumina, silica, PYROCERAM® 9606 (trademark of Corning Glass Corp., Corning, NY), cordierite, mullite and beryllia. None of these materials alone as a monolithic wall, with the required dielectric constant of less than 10.0 and loss tangent of less than 0.01, meets the criteria of high transmission efficiency, rain erosion and thermal stress resistance which are required of a radome for protection of antennas operating over a broad frequency range. In general, the broadband transmission efficiency of a solid wall or monolithic radome increases with lower dielectric constant. Slip cast fused silica has the lowest dielectric constant of the above materials (3.36) and exhibits good broadband transmission efficiency over a limited spectrum. Because of its low coefficient of expansion, it is the most resistant of the above materials to failures induced by differential thermal stresses. However, slip cast fused silica offers the poorest rain erosion and particle impact resistance. Alumina, the hardest of the above materials and most resistant to rain erosion and particle impact, exhibits the lowest resistance to failure due to thermal stresses. However, due to its high dielectric constant (9.0 to 10.0), alumina is the poorest broadband ceramic radome material.

In addition to the solid wall structures, "A", "B" and "C" sandwiches and multilayer designs can be considered for obtaining high power transmission efficiency over a broad band of frequencies. The "A" sandwich consists of a low dielectric constant core between two high dielectric constant skins. The dielectric constant of the core is usually less than the square root of the skin dielectric constant, with an electrical thickness equivalent to an odd multiple of approximately $\lambda/4$. The low dielectric constant of the core in a ceramic radome is usually obtained by reducing the density, i.e., increasing porosity. Although "A" sandwiches exhibit efficient power transmission, they are very sensitive to change in frequency and incident angle. Serious degradation of performance occurs above incident angles of 60°. Further, "A" sandwiches fail due to thermal stress differentials above velocities of Mach 3.

The "B" sandwich configuration consists of a dense, thin core of high dielectric constant material, with two thick skins of lower dielectric constant material. The dielectric constant of the core is usually greater than the square of the dielectric constant of the skins; see, e.g., U.S. Pat. No. 3,780,374, which discloses a three layer radome structure comprising a single layer dielectric plate of any desired thickness having a dielectric constant $E_r$ and two dielectric matching layers sandwiching the plate therebetween, each of the matching layers having an average dielectric constant of $E_r^{\frac{1}{2}}$ and a thickness which is an odd number multiple of $\lambda/4$, where $\lambda$ is the wavelength in the matching layer.

The "B" sandwich generally has a higher power transmission efficiency than the "A" sandwich; but since the low dielectric constant porous material is on the outside of the radome, its use in a high temperature, high performance missile is not practical.

The "C" sandwich configuration consists of two contiguous "A" sandwiches. Sensitivity to frequency, incident angle and polarization is less than with the "A" or "B" sandwiches.

Increasing the number of layers and optimizing the thicknesses result in higher power transmission efficiency over specified broadband spectra and reduce sensitivity to polarization and high incident angles as compared to the "A", "B", or "C" sandwiches; see, e.g., U.S. Pat. No. 3,002,190. Additionally, multilayers offer a higher stiffness-to-weight ratio than conventional monolithic wall radomes. Transmission efficiency in a multilayer system will increase as (1) the dielectric constant of the skin and core decrease, (2) the number of layers increase and (3) the skin thicknesses become smaller. Compliance with the second condition is a function of the rate of gain in transmission efficiency which can be obtaned by increasing the number of layers. Reduction of skin thickness to minimize reflections is a function of the load carrying requirements and fabrication techniques.

Alumina multilayers, optimized for maximum power transmission efficiency over a broadband of frequencies, perform less efficiently than electrically thin walls of silica. Alumina multilayers exhibit excellent particle impact resistance, but perform poorly when subjected to rain erosion at high Mach numbers.

Examples of references disclosing other configurations of radomes include U.S. Pat. Nos. 3,195,138, 3,292,544 and 3,396,396.

SUMMARY OF THE INVENTION

In accordance with the invention, a ceramic broadband radome adapted to effectively transmit high frequency energy and having the ability to withstand stress induced by thermal differentials comprises a rigid contoured object including a wall having a generally convex outer surface and a generally concave inner surface, the wall comprising alternating layers of silicon nitride and fused silica, including a layer of silicon nitride at both outer and inner surfaces and at least one additional layer of silicon nitride within the wall itself.

The radome is fabricated by a process which includes:

(a) forming a first layer comprising fused silica which has been compounded for permeability and minimum shrinkage and fired at a particular temperature;

(b) forming on one surface of the first layer a second layer comprising permeable silicon nitride deposited at substantially the same temperature used to form the first layer;

(c) forming on the second layer a third layer comprising permeable fused silica fired at substantially the same temperature;

(d) forming on the third layer a fourth layer comprising dense silicon nitride deposited at substantially the same temperature; and (e) forming on the exposed surface of the first layer a fifth layer comprising dense silicon nitride deposited at substantially the same temperature.

The ceramic broadband radome of the invention comprises alternating layers of silicon nitride and fused silica and is processed at elevated temperatures to form an in situ prestressed condition. Resistance to thermal stress, rain erosion, particle impact, aerodynamic loads and crack propagation is high, while high transmission efficiency is maintained over a wide band of radar frequencies.

BRIEF DESCRIPTION OF THE DRAWING

The FIGURE, in cross-section, is a partial view of a ceramic radome of the invention.

DETAILED DESCRIPTION OF THE INVENTION

An example of a ceramic broadband radome in accordance with the invention is shown in the FIGURE. A portion of ceramic radome 10 having a generally convex outer surface 11 and generally concave inner surface 12 is depicted in cross-section comprising five layers:

Layer 13 comprises fused silica which has been compounded for permeability and minimum shrinkage at a particular firing temperature, for example, 1200° C.

Layer 14 comprises permeable silicon nitride formed in situ at substantially the same temperature used to form layer 13.

Layer 15 comprises permeable fused silica formed under substantially the same conditions as layer 13.

Layers 16 and 17 comprise dense silicon nitride deposited in situ at substantially the same temperature used to form layer 13.

The layers of silica range from about 0.12 to 0.16 inch in thickness, while the layers of silicon nitride range from about 0.010 to 0.015 inch in thickness. Such thicknesses are compatible with radar frequencies of about 2 to 18 GHz and provide optimal transmission efficiency consistent with structural integrity. For layers thinner than these values, structural problems ensue, while for layers thicker than these values, transmission efficiency is reduced. Preferably, the thickness value of the fused silica layers is selected with respect to the expected operational radar frequency, with thinner values being associated with higher frequencies. The thickness range of the silicon nitride layer provides an "electrically thin" layer, which is usually defined as that value less than about $\lambda/10$ to $\lambda/20$.

The multilayer structure is conveniently fabricated by a process in accordance with the invention including:

(a) forming a first layer comprising fused silica which has been compounded for permeability and minimum shrinkage and fired at a particular temperature;

(b) forming on one surface of the first layer a layer comprising permeable silicon nitride deposited at substantially the same temperature used to form the first layer;

(c) forming on the second layer a third layer comprising permeable fused silica fired at substantially the same temperature;

(d) forming on the third layer a fourth layer comprising dense silicon nitride deposited at substantially the same temperature; and (e) forming on the opposite surface of the first layer a fifth layer comprising dense silicon nitride deposited at substantially the same temperature. Fabrication of additional alternating layers of silicon nitride and silica is accomplished in the same fashion as the process given above, except that additional inner layers of silicon nitride are permeable, as described below.

The fused silica layers may be formed by any process resulting in (1) controlled permeability, with a range in theoretical density of about 1.1 to 1.4 gm/cm$^3$; (2) minimized shrinkage during processing; and (3) a low dielectric constant between about 2.0 and 2.25. By minimized shrinkage is meant that the shrinkage of the fused silica is not substantially greater than that of pure slip cast fused silica.

A process especially efficacious in the production of fused silica layers comprises forming layers of slip cast fused silica. The mean particle size of the slip cast fused silica is conveniently about 6.0 μm. The largest particle size is about 40 μm, and less than 10 weight percent is smaller than 0.4 μm. Permeability and porosity is conveniently controlled by use of microballoons, such as phenolic microballoons. Other materials with controlled particle size which will burn out completely without leaving a residue, such as ground walnut shells and carbon, may also be used for controlling permeability and porosity. Control over the permeability permits obtaining the desired low dielectric constant. Shrinkage during processing is conveniently minimized by additions of "grog", which is an impure form of silica having a different particle size distribution than the slip.

In the preferred process, a mixture of coarse and fine silica grog and phenolic microballoons is employed. The particle size of the fine silica grog typically ranges from about 0.0010 to 0.0197 in, while the particle size of the coarse silica grog ranges from about 0.0049 to 0.0197 in. The particle size of the phenolic microballoons conveniently ranges between about 10 to 100 μm (0.0004 to 0.004 in).

In order to achieve a low density of about 1.1 to 1.4 gm/cm$^3$, the mixture preferably includes at least about 9 weight percent total of coarse and fine grog and less than about 6 weight percent of phenolic microballoons. However, in order to achieve a shrinkage upon firing less than that of 100% silica (i.e., a shrinkage less than about 4.8%), the mixture most preferably includes at least about 35 weight percent total of coarse and fine grog, with a ratio of coarse to fine additions ranging from about 2 to 9, and less than about 3 weight percent of phenolic microballoons. Additions of grog in excess of about 35% and of phenolic microballoons less than about 3% may be made consistent with the foregoing considerations of density, shrinkage and dielectric constant.

The first layer (layer 13) of fused silica is conveniently formed by casting fused silica slip containing the grog and phenolic microballoons into a Plaster-of-Paris mold, the inside contour of which defines the shape of the radome. The water in the slip is absorbed within the capillaries of the Plaster-of-Paris mold, thereby depositing solid material along the walls of the mold. When sufficient thickness of solid material is achieved, the excess slip, which has been held at a constant level in the mold, is removed. The cast form is allowed to dry in the mold. With continuous drying, the casting shrinks away from the mold and becomes sufficiently strong to permit handling. The cast form is removed from the mold, fired to a low temperature sufficient to drive off volatiles and the microballoons, then fired to an elevated temperature sufficient to sinter the cast slip.

The lower temperature is not critical and may range from about 600° to 900° C. A time of about 36 to 48 hrs. to reach temperature is generally adequate. Longer firing times at somewhat lower temperatures may also be employed.

The upper temperature ranges from about 1175° to 1225° C. Lower temperatures than this range do not result in adequate sintering, while higher temperatures result in the undesirable formation of a high expansion crystalline form of silicon dioxide, α-cristobalite. The time of firing is that which is adequate to result in sintering, generally about 1 to 2 hrs.

Subsequent layers of slip cast fused silica are formed employing substantially the same processing conditions given above. Since subsequent layers of fused silica are formed on layers of a different material so as to generate the alternating layered structure of the invention, it is preferred that such layers of different material be permeable, thereby avoiding the necessity of employing Plaster-of-Paris molds for successive layer formation.

The silicon nitride layers may be formed by any process such that the fused silica is at a high temperature when the deposition is made in order to prestress the radome. Preferably, the temperature employed for in situ deposition is substantially the same as that used to sinter the fused silica. Lower temperatures do not result in prestressing, while higher temperatures result in undesirable additional shrinkage of the silica and the possibility of α-cristobalite formation.

Silicon nitride is conveniently deposited by chemical vapor deposition, employing well-known process parameters. A general CVD reaction is $$3SiCl_4 + 4NH_3 \rightarrow Si_3N_4 + 12HCl$$

The temperature of the process is adjusted such that the fused silica experiences a temperature about the same as that used in the sintering process.

Inner layers of silicon nitride are desirably sufficiently permeable to permit passage of water under pressure, as discussed above. Outside layers of silicon nitride are desirably dense (approaching a density of 3.2 gm/cm$^3$), in order to protect against rain erosion and moisture absorption. The relative permeability of silicon nitride is adjusted by changing the carrier gas ratios.

The silicon nitride as deposited by the foregoing process has a dielectric constant of about 6.0. Due to the nature of the process, the material deposited is substantially silicon nitride, but may contain silicon oxynitride and possibly even silica.

The combination of process steps described above results in a prestressed radome. In a radome travelling at high velocities, the exterior wall is hotter than the interior wall. Consequently, the exterior portion is in compression, while the interior is in tension. This effect often results in structural failure of prior art ceramic radomes initiated on the inner surface of the radome, since ceramic material has a low tensile strength as compared to the compressive strength. By prestressing in accordance with the invention, however, the interior portion of the radome wall is provided with a higher tensile load carrying capacity and thus higher loads are required to induce failures.

The higher thermal expansion coefficient of the silicon nitride places the lower expansion fused silica in compression during the cooling phase of the fabrication sequence, thereby resulting in the desired prestressed condition. Consequently, application of silicon nitride to the fused silica substrate at about the same temperature used to sinter the silica, for example, 1200° C., places the former material ($Si_3N_4$) in tension and the latter material ($SiO_2$) in compression at any temperature below 1200° C. In a five-layer system comprising two layers of silica, each with a thickness of 4.06 mm (0.16 in), and three of silicon nitride, each with a thickness of 0.33 mm (0.013 in), the compressive prestress in the layers of silica is $34,130 \times 10^3$ pascals (4,950 psi) at room temperature. The tensile prestress in the silicon nitride layers is $20,540 \times 10^3$ pascals (29,792 psi) at room temperature.

For a worst trajectory case in which the radome reaches a temperature of 893° C., the compressive prestress on the fused silica and tensile prestress in the silicon nitride layers is $8,115 \times 10^3$ pascals (1,177 psi) and 40,600 pascals (5,888 psi), respectively.

The ceramic broadbend radome of the invention thus comprises at least five alternating layers of silicon nitride and fused silica, including a layer of silicon nitride at both outer and inner surfaces and at least one additional layer of silicon nitride within the wall.

The alternating layers of silicon nitride and silica, fabricated in accordance with the invention, provide a broadband, prestressed radome, which (1) is capable of operating at velocities up to Mach 4.5, (2) has transmission efficiency above 90% at radar frequencies of interest, (3) has high resistance to failure due to thermal stress differentials and rain drop and particle impact loads and (4) evidences reduced cracking and crack propagation.

EXAMPLES

Examples 1–33

Shrinkages of Slip Cast Fused Silica With Grog and Microballoon Additions

Slip cast fused silica, coarse and fine silica grog and phenolic microballoons were mixed and fired at 1285° C. for 1 to 2 hrs. The proportions (weight percent) of the constituents, shrinkage upon firing, apparent bulk density and apparent porosity are listed in Table I below.

Bodies containing less than about 6 weight percent microballoons evidenced consistently low shrinkages and bulk density values. Examples 31, 32 and 33, with less than about 3 weight percent microballoons, evidenced shrinkages less than that of slip cast fused silica.

coarse grog of 94 weight percent through 35 mesh on 115 mesh with 0.1 weight percent through 325 mesh on 400 mesh, 573 gm fine grog of 50 weight percent through 35 mesh on 115 mesh to 2 weight percent through 400 mesh (slip and grog available from Thermo-Materials Corp. Atlanta, GA), 136 gm phenolic microballoons of 0.0004 to 0.004 in (available from Union Carbide Corp., New York, NY), 88 ml isopropyl alcohol, 665 ml deionized water and 130 ml concentrated HCl. The casting was performed in a Plaster-of-Paris mold with a plaster to water ratio of 1.25. The concave surface of the mold was sprayed with a graphite or lanolin-base mold release. After the proper thickness of silica was achieved, the casting was removed from mold and dried for 24 hours at ambient conditions, heated at a rate of 5° C./hr to 400° C., held there for 16 hours, heated at a rate of 100° C./hr to 800° C., fired from 800° C. to 200° C. at a rate of 120° C./hr, held for 2 hrs and cooled naturally.

The silicon nitride layer 14 was deposited on the convex side of the fused silica layer at 1200° C. employing hydrogen flowing at a rate of 41.7 cm$^3$/sec (2.5 l/min), ammonia flowing at a rate of 6.0 cm$^3$/sec (0.36 l/min), silicon tetrachloride (carried by nitrogen) flowing at a rate of 7.5 cm$^3$/sec (0.45 l/min) and nitrogen flowing at a rate of 33.3 cm$^3$/sec (2 l/min) at a pressure of 33 mm Hg.

TABLE I

COMPOSITION AND PHYSICAL PROPERTIES OF SILICA BODIES CONTAINING MIXTURES OF FINE AND COARSE GROG AND PHENOLIC MICROBALLOONS

| Example | Silica Derived From Slip (%) | Grog Additions (%) Coarse | Grog Additions (%) Fine | Microballoon (%) | Firing Shrinkage (%) | Apparent Bulk Density (gm/cm$^3$) | Apparent Porosity (%) |
|---|---|---|---|---|---|---|---|
| 1 | 100.0 | — | — | — | 4.8 | 1.98 | 6.1 |
| 2 | 84.6 | 9.3 | — | 6.1 | 4.8 | 1.10 | 51.6 |
| 3 | 75.3 | 18.6 | — | 6.1 | 5.7 | 1.14 | 50.1 |
| 4 | 66.0 | 28.0 | — | 6.0 | 4.8 | 1.09 | 51.7 |
| 5 | 84.6 | — | 9.3 | 6.1 | 6.6 | 1.19 | 47.9 |
| 6 | 75.3 | — | 18.6 | 6.1 | 5.8 | 1.11 | 51.5 |
| 7 | 66.0 | — | 28.0 | 6.0 | 5.1 | 1.08 | 52.2 |
| 8 | 84.6 | 7.4 | 1.9 | 6.1 | 10.2 | 1.24 | 44.8 |
| 9 | 84.6 | 1.9 | 7.4 | 6.1 | 10.9 | 1.13 | 44.9 |
| 10 | 75.3 | 14.9 | 3.7 | 6.1 | 8.5 | 1.13 | 51.2 |
| 11 | 75.3 | 3.7 | 14.9 | 6.1 | 8.6 | 1.08 | 50.9 |
| 12 | 66.0 | 22.4 | 5.6 | 6.0 | 5.3 | 1.06 | 52.6 |
| 13 | 66.0 | 5.6 | 22.4 | 6.0 | 5.8 | 1.00 | 55.9 |
| 14 | 90.1 | — | — | 9.9 | 4.4 | 1.81 | 16.7 |
| 15 | 82.0 | — | — | 18.0 | 4.1 | 1.78 | 18.4 |
| 16 | 75.0 | — | — | 25.0 | 3.4 | 1.78 | 18.1 |
| 17 | 84.6 | 9.3 | — | 3.1 | 7.2 | 1.62 | 22.1 |
| 18 | 73.0 | 24.3 | — | 2.6 | 6.3 | 1.68 | 20.3 |
| 19 | 71.2 | 23.7 | — | 5.1 | 6.8 | 1.54 | 29.4 |
| 20 | 90.1 | — | 9.9 | — | 4.4 | 1.80 | 18.3 |
| 21 | 82.0 | — | 18.0 | — | 3.4 | 1.76 | 18.7 |
| 22 | 87.3 | — | 9.6 | 3.1 | 8.0 | 1.64 | 21.0 |
| 23 | 79.6 | — | 17.5 | 2.9 | 7.4 | 1.66 | 20.7 |
| 24 | 73.0 | 12.4 | 11.2 | 3.3 | 4.9 | 1.39 | 37.8 |
| 25 | 73.0 | 3.1 | 20.5 | 3.3 | 5.5 | 1.38 | 38.3 |
| 26 | 79.5 | 13.5 | 3.4 | 3.6 | 6.2 | 1.38 | 38.3 |
| 27 | 97.0 | — | — | 3.0 | 5.0 | 1.58 | 24.0 |
| 28 | 94.2 | — | — | 5.8 | 6.9 | 1.40 | 35.8 |
| 29 | 79.6 | 4.3 | 12.5 | 3.6 | 5.9 | 1.38 | 39.0 |
| 30 | 73.4 | 2.8 | 20.5 | 3.3 | 4.9 | 1.39 | 38.4 |
| 31 | 62.3 | 31.4 | 3.4 | 2.8 | 3.0 | 1.40 | 38.0 |
| 32 | 62.1 | 23.2 | 11.9 | 2.8 | 2.9 | 1.37 | 39.1 |
| 33 | 62.3 | 13.6 | 21.3 | 2.8 | 4.0 | 1.39 | 38.1 |

EXAMPLE 34

Fabrication of 5-inch Hemisphere

Referring to the FIGURE, a 5-inch hemisphere ceramic radome was fabricated. Layer 13 was formed by combining 2,000 ml fused silica slip with a mean particle size of 6.0 μm and a specific gravity of 1.86, 1,120 gm Deposition of the silica layer 15 was done by vacuum casting. The water in the slip permeated through the silicon niride layer 14 and into the pores of silica layer 13, depositing silica on the silicon nitride surface. The processing schedule was the same as for layer 13, except that the burnout rate for the phenolic microballoons was as high as 50° C./hr.

The deposition of silicon nitride layers 16 and 17 was performed in the same manner as silicon nitride layer 14. The higher density (as compared to layer 14) of layers 16 and 17 was achieved by reducing the nitrogen flow rate.

EXAMPLE 35

Evaluation of 5-inch Hemispheres

Transmission measurements were performed on a radome fabricated as in Example 34 having the parameters listed in Table II below:

TABLE II

THICKNESS, DIELECTRIC CONSTANT AND LOSS TANGENT OF VARIOUS LAYERS

| Layer Material | Thickness (inches) | $\epsilon$ | tan $\delta$ |
|---|---|---|---|
| Silicon nitride | 0.013 | 6.0 | 0.009 |
| Silica | 0.150 to 0.160 | 2.1 | 0.0001 |
| Silicon nitride | 0.011 | 6.0 | 0.009 |
| Silica | 0.150 to 0.160 | 2.1 | 0.0001 |
| Silicon nitride | 0.013 | 6.0 | 0.009 |

The test setup consisted of a receiving horn, an open waveguide transmitting antenna and an RF source. All transmission measurements were made at frequencies between 6.0 and 17.7 GHz.

The beamwidth of the open waveguide was approximately 58°, and therefore a particular angle of incidence could not be designated. Additionally, since the source and receive antennas were pointed toward the middle of the radome, the measurement was confined to a point. As a result, the perpendicular or parallel polarization could not be defined. The point measurement was spread over more than one incident angle. Therefore, the measured transmission value was an average between parallel and perpendicular polarization over the area covered by the beamwidth.

Measurements were made at various points about the radome axis of symmetry. Transmissions varied by ±1.0 dB to ±1.5 dB. It should be noted that the transmission results were approximate, as though a curved specimen were evaluated. The measured transmission efficiency is compared to the theoretical transmission efficency of the radome system in Table III below.

The insertion phase delay is the added phase to the insertion of a dielectric shape between a sending and receiving radar antenna. Boresight and boresight error slope are the results of insertion phase delay. The acceptable ranges of insertion phase delay are a function of the mission and radar frequencies employed in any missile system. The difference between perpendicular and parallel polarization was found to be small, even at an angle of incidence of 50°.

TABLE III

THEORETICAL AND MEASURED TRANSMISSION EFFICIENCY OF MULTILAYER RADOME

| Frequency (GHz) | Measured Transmission Efficiency (%) | Theoretical Transmission Efficiency (%)* Angle of Incidence | |
|---|---|---|---|
| | | 0° | 60° |
| 6.0 | 71.4 | 80.0 | 40.0 |
| 6.5 | 50.0 | — | — |
| 7.0 | 50.0 | 82.0 | 42.0 |
| 7.5 | 50.0 | — | — |
| 8.0 | 71.4 | 90.0 | 48.0 |

TABLE III-continued

THEORETICAL AND MEASURED TRANSMISSION EFFICIENCY OF MULTILAYER RADOME

| Frequency (GHz) | Measured Transmission Efficiency (%) | Theoretical Transmission Efficiency (%)* Angle of Incidence | |
|---|---|---|---|
| | | 0° | 60° |
| 8.5 | 79.4 | — | — |
| 9.0 | 71.4 | 96.0 | 62.0 |
| 9.5 | 71.4 | — | — |
| 10.0 | 71.4 | 98.0 | 76.0 |
| 10.5 | 71.4 | — | — |
| 11.0 | 63.0 | 96.0 | 88.0 |
| 11.5 | 100.0 | — | — |
| 12.0 | 100.0 | 90.0 | 97.0 |
| 13.0 | 100.0 | 84.0 | 84.0 |
| 14.0 | 100.0 | 82.0 | 65.0 |
| 15.0 | 100.0 | 82.0 | 50.0 |
| 16.0 | 50.0 | 84.0 | 45.0 |
| 17.7 | 100.0 | 95.0 | 42.0 |

*Transmission efficiency approximately calculated according to
$|T|^2 = 1 - [(\epsilon^{\frac{1}{2}} - \epsilon^{\frac{1}{2}})/\epsilon(^{\frac{1}{2}} + \epsilon^{\frac{1}{2}})] \times [1 - \cos(4 \epsilon^{\frac{1}{2}} \tau^{\frac{1}{2}}/\lambda)]^2$
where $|T|^2$ is the transmittance, $\epsilon$ is the dielectric constant, $\tau$ is the radome thickness and $\lambda$ is the wave-length. This equation does not take into account multiple reflections.

What is claimed is:

1. A process for fabricating a ceramic broadband radome which includes:
   (a) forming a first layer comprising fused silica which has been compounded for permeability and minimum shrinkage and fired at a particular temperature;
   (b) forming on one surface of said first layer a second layer comprising permeable silicon nitride deposited at substantially the same temperature used to form said first layer;
   (c) forming on said second layer a third layer comprising permeable fused silica fired at substantially said temperature;
   (d) forming on said third layer, a fourth layer comprising dense silicion nitride deposited at substantially said temperature; and
   (e) forming on the exposed surface of said first layer a fifth layer comprising dense silicon nitride deposited at substantially said temperature.

2. The process of claim 1 in which said particular temperature ranges from 1175° to 1225° C.

3. The process of claim 2 in which said particular temperature is about 1200° C.

4. The process of claim 1 in which said fused silica is prepared by a process which includes (a) mixing slip cast fused silica, silica grog and microballoons to form a mixture, (b) firing said mixture at a first temperature sufficient to drive off voltatiles and microballoons and (c) firing said mixture at said particular temperature.

5. The process of claim 4 in which said mixture includes at least about 9 weight percent total of coarse and fine silica grog, said coarse grog having a particle size ranging from about 0.0049 to 0.0197 in and said fine grog having a particle size ranging from about 0.0010 to 0.0197 in, and less than about 6 weight percent of phenolic microballoons having a particle size ranging from about 0.0004 to 0.004 in.

6. The process of claim 5 in which said mixture includes at least about 35 weight percent total of coarse and fine silica grog, with the ratio of coarse to fine ranging from about 2 to 9, and less than about 3 weight percent of phenolic microballoons.

7. The process of claim 1 in which the thickness of each fused silica layer ranges from about 0.12 to 0.16 inch and of each silica nitride layer, from about 0.010 to 0.015 inch.

8. Product formed by the process of claim 1.

9. A ceramic broadband radome adapted to effectively transmit high frequency energy and having the ability to withstand stresses induced by thermal differentials comprising a rigid contoured object including a wall having a generally convex outer surface and a generally concave inner surface, said wall comprising alternating layers of silicon nitride and fused silica, including a layer comprising silicon nitride at both outer and inner surfaces and at least one additional layer comprising silicon nitride within said wall, formed in a prestressed condition.

10. The radome of claim 1 in which the thickness of each fused silica layer ranges from about 0.12 to 0.16 inch and of each silicon nitride layer, from about 0.010 to 0.015 inch.

* * * * *